US010667156B2

(12) United States Patent
Tong et al.

(10) Patent No.: US 10,667,156 B2
(45) Date of Patent: May 26, 2020

(54) BASE STATION AND RADIO TERMINAL

(71) Applicant: KYOCERA CORPORATION, Kyoto (JP)

(72) Inventors: Fangwei Tong, Machida (JP); Atsuhisa Inakoshi, Yokohama (JP); Hiroyuki Urabayashi, Yokohama (JP); Chiharu Yamazaki, Tokyo (JP); Kugo Morita, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 40 days.

(21) Appl. No.: 16/093,864

(22) PCT Filed: Apr. 24, 2017

(86) PCT No.: PCT/JP2017/016154
§ 371 (c)(1),
(2) Date: Oct. 15, 2018

(87) PCT Pub. No.: WO2017/188173
PCT Pub. Date: Nov. 2, 2017

(65) Prior Publication Data
US 2019/0110216 A1    Apr. 11, 2019

(30) Foreign Application Priority Data

Apr. 26, 2016 (JP) ................................. 2016-088306

(51) Int. Cl.
*H04W 24/08* (2009.01)
*H04L 5/00* (2006.01)
(Continued)

(52) U.S. Cl.
CPC .............. *H04W 24/08* (2013.01); *H04B 7/10* (2013.01); *H04L 5/0048* (2013.01); *H04J 11/00* (2013.01);
(Continued)

(58) Field of Classification Search
CPC ........ H04B 7/10; H04W 24/08; H04W 88/08; H04W 88/02; H04W 72/044; H04L 5/0048; H04J 11/00
See application file for complete search history.

(56) References Cited

U.S. PATENT DOCUMENTS

2003/0078012 A1\* 4/2003 Ito ......................... H01Q 1/243
455/82
2016/0065388 A1  3/2016 Kakishima et al.
(Continued)

FOREIGN PATENT DOCUMENTS

| JP | H09-162842 A | 6/1997 |
| WO | 2014/162805 A1 | 10/2014 |
| WO | 2015/008801 A1 | 1/2015 |

*Primary Examiner* — Brian D Nguyen
(74) *Attorney, Agent, or Firm* — Studebaker & Brackett PC

(57) ABSTRACT

A base station (200) according to an embodiment performs radio communication with a radio terminal (100). The base station transmits a reference signal to the radio terminal with a specific polarized wave, receives, from the radio terminal, polarized wave adjustment information generated by using the reference signal, adjusts a polarized wave based on the specific polarized wave by using the polarized wave adjustment information, and transmits an information signal to the radio terminal with the adjusted polarized wave.

8 Claims, 8 Drawing Sheets

(51) Int. Cl.
*H04B 7/10* (2017.01)
*H04J 11/00* (2006.01)
*H04W 72/04* (2009.01)
*H04W 88/02* (2009.01)
*H04W 88/08* (2009.01)

(52) U.S. Cl.
CPC .......... *H04W 72/044* (2013.01); *H04W 88/02* (2013.01); *H04W 88/08* (2013.01)

(56) References Cited

U.S. PATENT DOCUMENTS

| | | | | |
|---|---|---|---|---|
| 2016/0134347 | A1* | 5/2016 | Asplund | H04B 7/0413 375/267 |
| 2017/0033481 | A1* | 2/2017 | Schmalbuch | H01R 4/06 |
| 2017/0366981 | A1* | 12/2017 | Takano | H04W 16/28 |
| 2018/0040951 | A1* | 2/2018 | Uchiyama | H01Q 3/08 |

\* cited by examiner

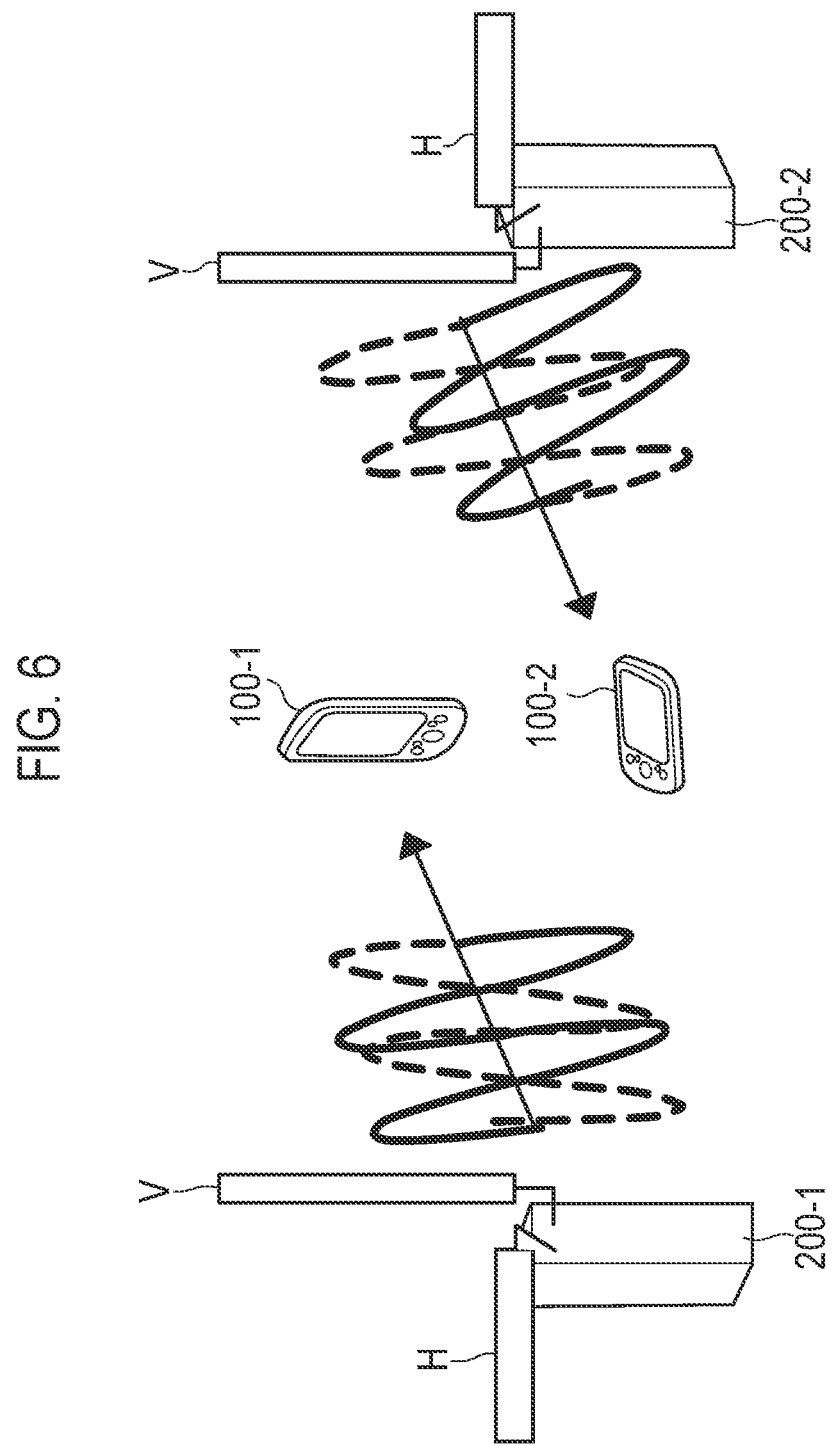

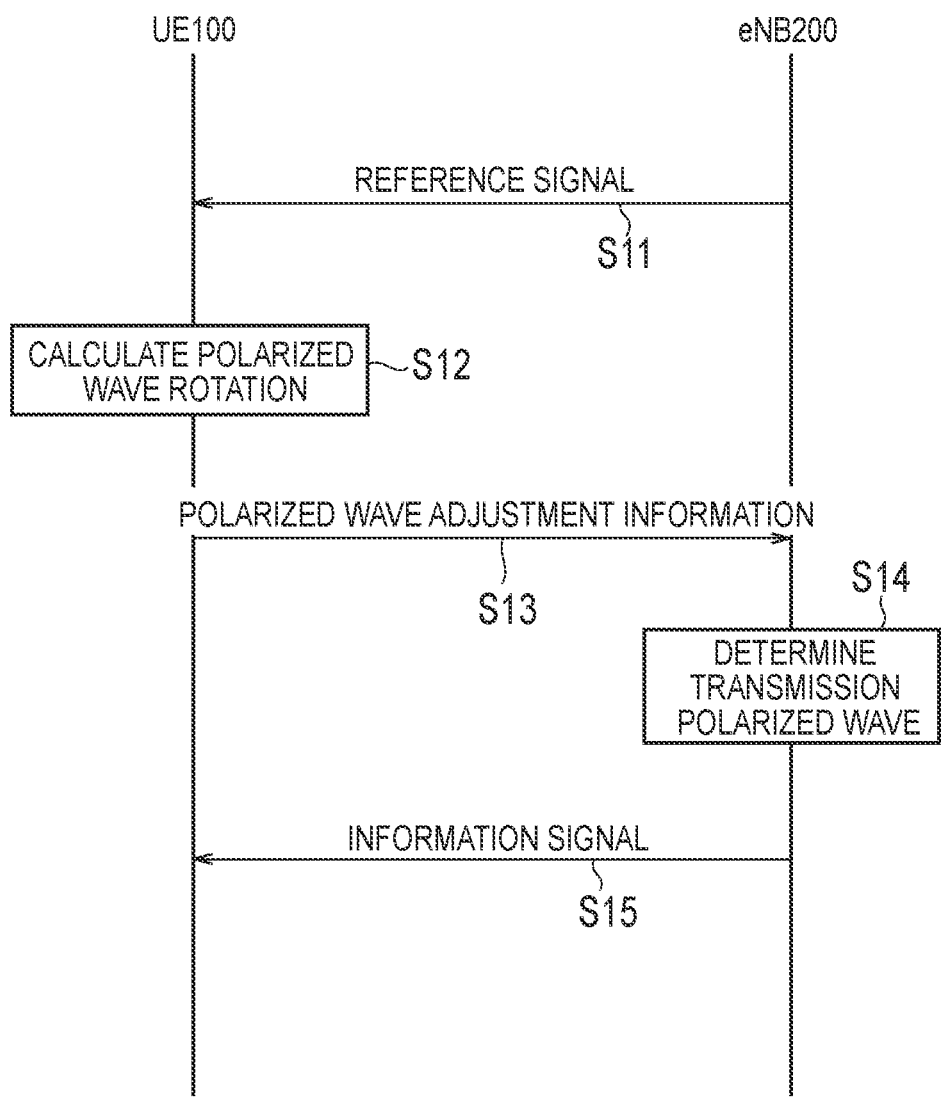

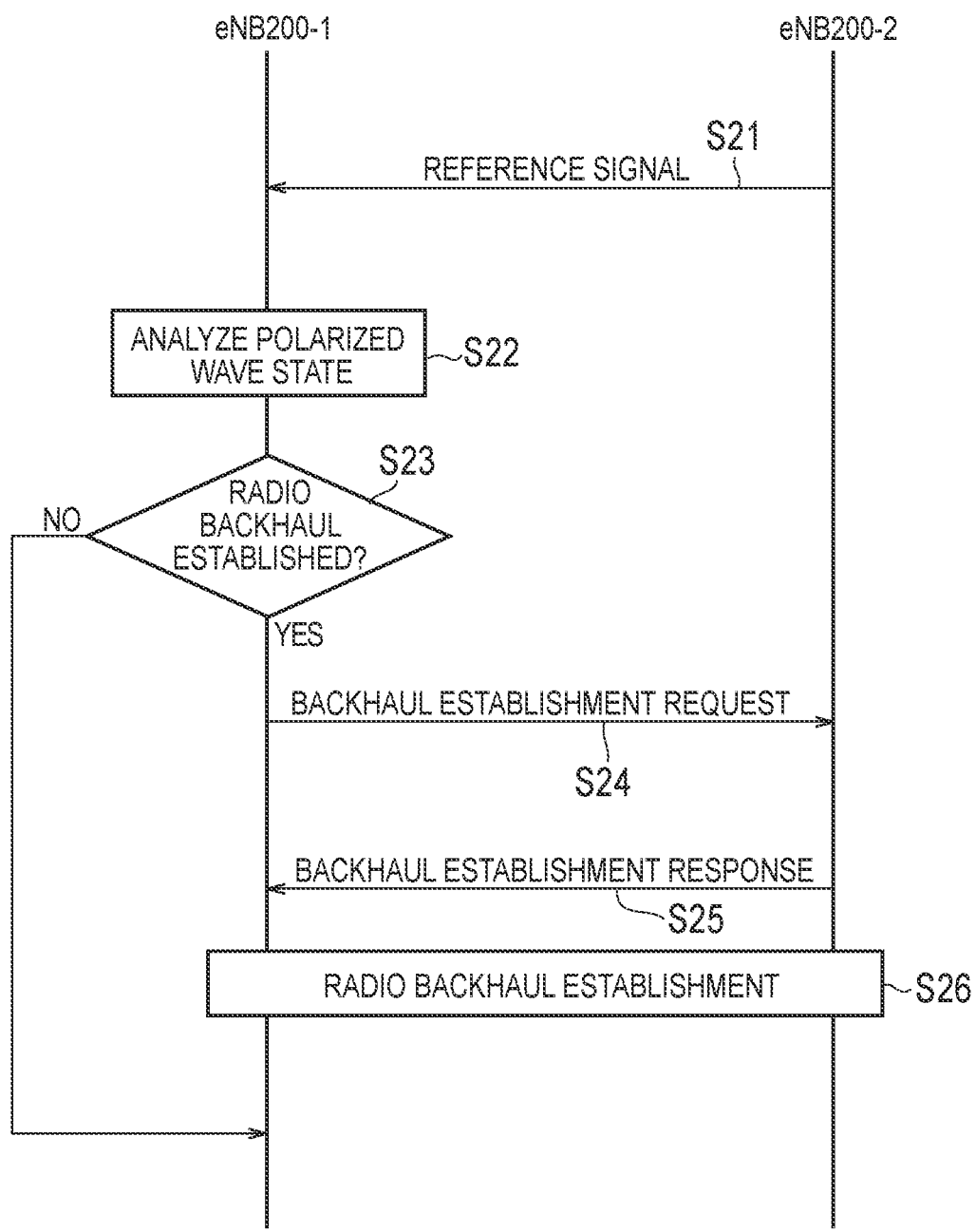

BASE STATION AND RADIO TERMINAL

TECHNICAL FIELD

The present disclosure relates to a base station and a radio terminal used in a radio communication system.

BACKGROUND ART

In recent years, researches for realizing a next generation radio communication system, called 5th generation (5G), are actively conducted. For element technologies of 5G, it is assumed that the cells are miniaturized and densely arranged, the band is broadened by using a high frequency band, and the like.

On the other hand, a multiplex communication technique using orthogonality of polarized waves is known (see, for example, Patent Literature 1). A radio communication system disclosed in Patent Literature 1 performs communication of a plurality of channels by using different polarized waves in the same frequency band.

CITATION LIST

Patent Literature

Patent Literature 1: JP 9-162842 A

SUMMARY OF INVENTION

A base station according to an embodiment is configured to perform radio communication with a radio terminal. The base station includes: a transmitter configured to transmit a reference signal to the radio terminal with a specific polarized wave; a receiver configured to receive, from the radio terminal, polarized wave adjustment information generated by using the reference signal; and a controller configured to adjust a polarized wave based on the specific polarized wave by using the polarized wave adjustment information. The transmitter is configured to transmit an information signal to the radio terminal with the adjusted polarized wave.

A radio terminal according to an embodiment is configured to perform radio communication with a base station. The radio terminal includes: a receiver configured to receive, from a base station, a reference signal transmitted with a specific polarized wave; a controller configured to generate polarized wave adjustment information used for adjusting a polarized wave by the base station by calculating a difference between a polarized wave of the received reference signal and the specific polarized wave; and a transmitter configured to transmit the polarized wave adjustment information to the base station.

A base station according to an embodiment is configured to perform radio communication with a radio terminal. The base station includes: a receiver configured to receive, from another base station, a reference signal transmitted with a specific polarized wave; and a controller configured to calculate a difference between a polarized wave of the received reference signal and the specific polarized wave, and determine whether line-of-sight communication is possible between the base station and the another base station based on the difference.

BRIEF DESCRIPTION OF DRAWINGS

FIG. 6 is a diagram illustrating an assumed scenario according to a first embodiment.

FIG. 7 is a diagram illustrating an operation sequence according to the first embodiment.

FIG. 11 is a diagram illustrating an operation sequence according to a second embodiment.

DESCRIPTION OF EMBODIMENTS (Radio Communication System)

An architecture of a radio communication system according to an embodiment will be described. The radio communication system according to the embodiment is a Long Term Evolution (LTE) system based on the Third Generation Partnership Project (3GPP) standard.

Figure 1:
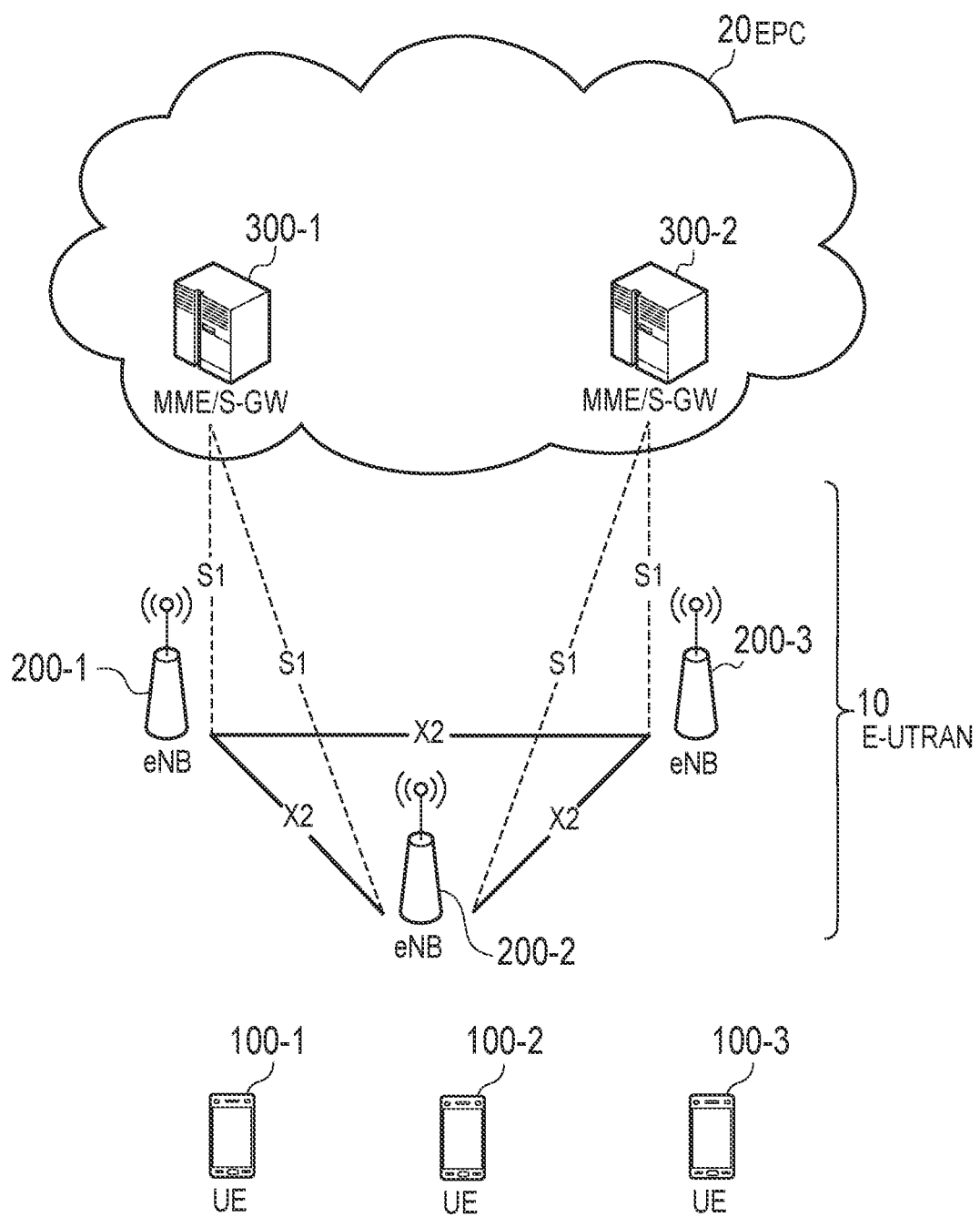
FIG. 1 is a diagram illustrating a configuration of an LTE system according to an embodiment.

FIG. 1 is a diagram illustrating a configuration of an LTE system according to an embodiment. As illustrated in FIG. 1, the LTE system includes a user equipment (UE) 100, an evolved-UMTS terrestrial radio access network (E-UTRAN) 10, and an evolved packet core (EPC) 20.

The UE 100 corresponds to a radio terminal. The UE 100 is a mobile communication apparatus and performs communication with a cell (serving cell).

The E-UTRAN 10 corresponds to a radio access network. The E-UTRAN 10 includes an evolved Node-B (eNB) 200. The eNB 200 corresponds to a base station. The eNBs 200 are connected to each other via an X2 interface.

The eNB 200 manages one or more cells and performs radio communication with the UE 100 that has established connection to the cell. The eNB 200 has a radio resource management (RRM) function, a user data (hereinafter, simply referred to as "data") routing function, a measurement control function for mobility control and scheduling, and the like. The "cell" is used as the term indicating a minimum unit of radio communication area. The "cell" is used as the term indicating a function of performing radio communication with the UE 100.

The EPC 20 corresponds to a core network. The EPC 20 includes a mobility management entity (MME)/serving-gateway (S-GW) 300. The MME performs various types of mobility control or the like on the UE 100. The S-GW performs data transfer control. The MME/S-GW 300 is connected to the eNB 200 via an S1 interface.

Figure 2:
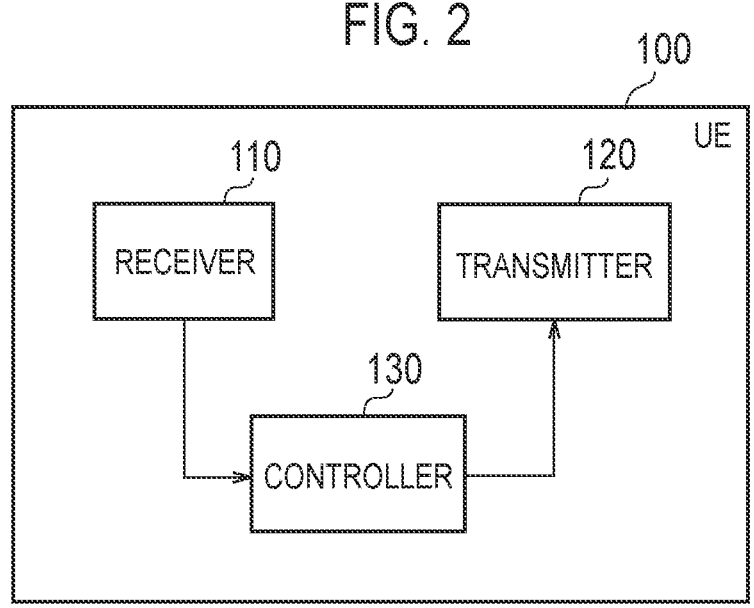
FIG. 2 is a diagram illustrating an architecture of a UE (radio terminal) according to an embodiment.

FIG. 2 is a diagram illustrating the architecture of the UE 100 (radio terminal). As illustrated in FIG. 2, the UE 100 includes a receiver 110, a transmitter 120, and a controller 130.

The receiver 110 performs a variety of reception under the control of the controller 130. The receiver 110 includes an antenna and a receiver. The receiver converts a radio signal received by the antenna into a baseband signal (reception signal) and outputs the baseband signal to the controller 130.

The transmitter 120 performs a variety of transmission under the control of the controller 130. The transmitter 120 includes an antenna and a transmitter. The transmitter converts a baseband signal (transmission signal) output by the controller 130 into a radio signal and transmits the radio signal from the antenna.

The controller 130 performs a variety of control on the UE 100. The controller 130 includes a processor and a memory. The memory stores a program executed by the processor and information used for processing by the processor. The processor includes a baseband processor and a central processing unit (CPU). The baseband processor modulates and demodulates the baseband signal, encodes and decodes the baseband signal, and the like. The CPU executes a program stored in the memory and performs a variety of processes. The processor performs a process to be described later.

Figure 3:
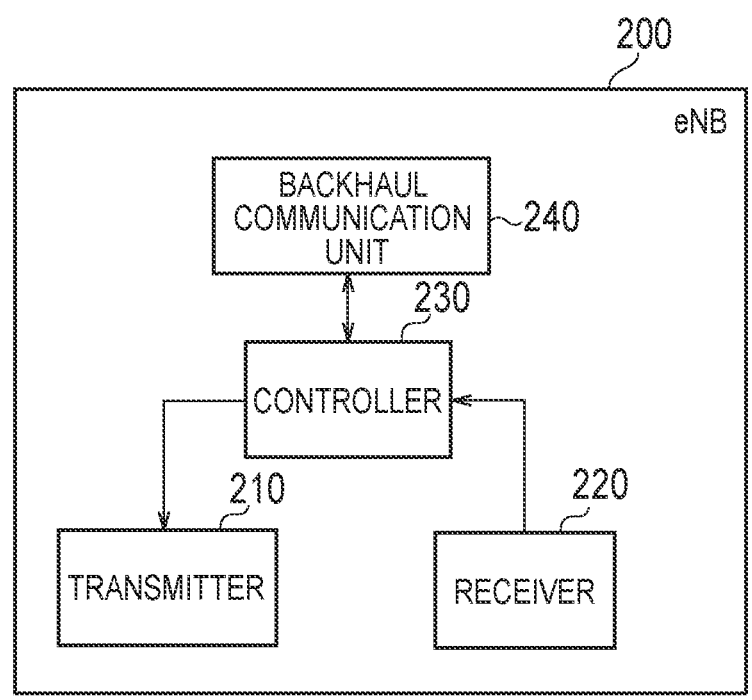
FIG. 3 is a diagram illustrating an architecture of an eNB (base station) according to an embodiment.

FIG. 3 is a diagram illustrating the architecture of the eNB 200 (base station). As illustrated in FIG. 3, the eNB 200 includes a transmitter 210, a receiver 220, a controller 230, and a backhaul communication unit 240.

The transmitter 210 performs a variety of transmission under the control of the controller 230. The transmitter 210 includes an antenna and a transmitter. The transmitter converts a baseband signal (transmission signal) output by the controller 230 into a radio signal and transmits the radio signal from the antenna.

The receiver 220 performs a variety of reception under the control of the controller 230. The receiver 220 includes an antenna and a receiver. The receiver converts a radio signal received by the antenna into a baseband signal (reception signal) and outputs the baseband signal to the controller 230.

The controller 230 performs a variety of control on the eNB 200. The controller 230 includes a processor and a memory. The memory stores a program executed by the processor and information used for processing by the processor. The processor includes a baseband processor and a central processing unit (CPU). The baseband processor modulates and demodulates the baseband signal, encodes and decodes the baseband signal, and the like. The CPU executes a program stored in the memory and performs a variety of processes. The processor performs a process to be described later.

The backhaul communication unit 240 is connected to a neighbour eNB 200 via an X2 interface. The backhaul communication unit 240 is connected to the MME/S-GW 300 via the S1 interface. The backhaul communication unit 240 is used for communication performed on the X2 interface, communication performed on the S1 interface, and the like.

Figure 4:
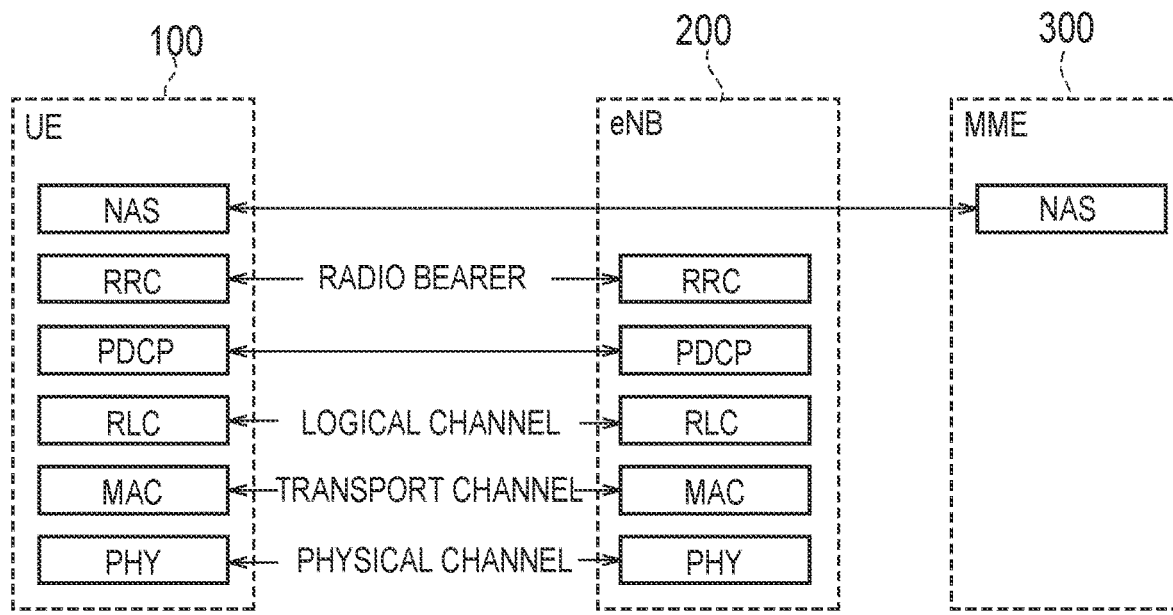
FIG. 4 is a diagram illustrating an architecture of a protocol stack of a radio interface in an LTE system.

FIG. 4 is a diagram illustrating the architecture of the protocol stack of the radio interface in the LTE system. As illustrated in FIG. 4, a radio interface protocol is divided into first to third layers of an OSI reference model. The first layer is a physical (PHY) layer. The second layer includes a medium access control (MAC) layer, a radio link control (RLC) layer, and a packet data convergence protocol (PDCP) layer. The third layer includes a radio resource control (RRC) layer.

The PHY layer performs coding and decoding, modulation and demodulation, antenna mapping and demapping, and resource mapping and demapping. Data and control signals are transmitted between the PHY layer of the UE 100 and the PHY layer of the eNB 200 via a physical channel.

The MAC layer performs priority control of data, a retransmission process by hybrid ARQ (HARQ), a random access procedure, and the like. Data and control signals are transmitted between the MAC layer of the UE 100 and the MAC layer of the eNB 200 via a transport channel. The MAC layer of the eNB 200 includes a scheduler. The scheduler determines uplink and downlink transport formats (transport block size, modulation and coding scheme (MCS)) and resource blocks allocated to the UE 100.

The RLC layer transmits data to the RLC layer on the receiving side by using the functions of the MAC layer and the PHY layer. Data and control signals are transmitted between the RLC layer of the UE 100 and the RLC layer of the eNB 200 via a logical channel.

The PDCP layer performs header compression and decompression, and encryption and decryption.

The RRC layer is defined only in a control plane that handles the control signals. A message (RRC message) for various configurations is transmitted between the RRC layer of the UE 100 and the RRC layer of the eNB 200. The RRC layer controls logical channels, transport channels, and physical channels in response to establishment, re-establishment, and release of radio bearers. If there is a connection (RRC connection) between the RRC of the UE 100 and the RRC of the eNB 200, the UE 100 is in an RRC connected mode. Otherwise, the UE 100 is in the RRC idle mode.

A non-access stratum (NAS) layer, which is located above the RRC layer, performs session management, mobility management, and the like.

Figure 5:
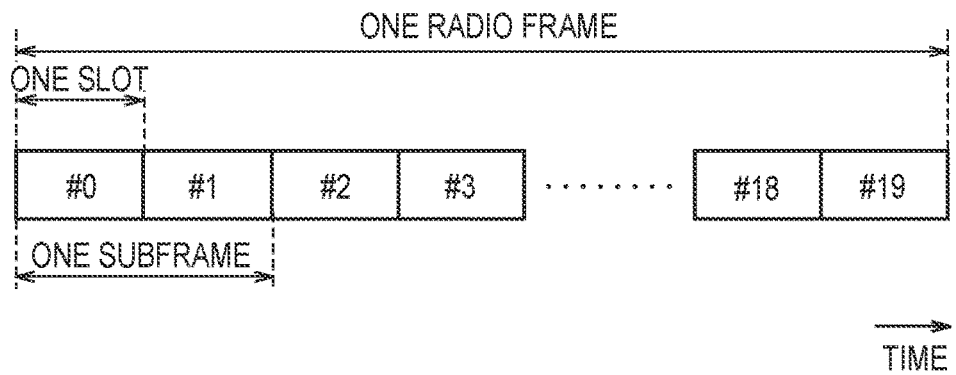
FIG. 5 is a diagram illustrating an architecture of a radio frame used in an LTE system.

FIG. 5 is a diagram illustrating the architecture of the radio frame used in the LTE system. As illustrated in FIG. 5, the radio frame includes ten subframes arranged in a time direction. Each subframe includes two slots arranged in the time direction. The length of each subframe is 1 ms. The length of each slot is 0.5 ms. Each subframe includes a plurality of resource blocks (RB) in a frequency direction and includes a plurality of symbols in the time direction. Each resource block includes a plurality of subcarriers in the frequency direction. One symbol and one subcarrier constitute one resource element (RE). Among the time and frequency resources allocated to the UE 100, the frequency resource can be specified by the resource block and the time resource can be specified by the subframe (or slot).

In the downlink, a section of several symbols in the head of each subframe is a region that is mainly used as a physical downlink control channel (PDCCH) for transmitting downlink a control signal. The remaining portion of each subframe is a region that is mainly used as a physical downlink shared channel (PDSCH) for transmitting downlink data.

In the uplink, both end portions in the frequency direction in each subframe is a region that is mainly used as a physical uplink control channel (PUCCH) for transmitting an uplink control signal. The remaining portion of each subframe is a region that is mainly used as a physical uplink shared channel (PUSCH) for transmitting uplink data.

First Embodiment

The first embodiment will be described below.
(1) Overview of First Embodiment

The eNB 200 according to the first embodiment performs radio communication with the UE 100. As illustrated in FIG. 3, the transmitter 210 transmits a reference signal to the UE 100 with a specific polarized wave. The receiver 220 receives polarized wave adjustment information generated by using the reference signal from the UE 100. The controller 230 uses the polarized wave adjustment information to adjust the polarized wave based on a specific polarized wave. The transmitter 210 transmits an information signal to the UE 100 with the adjusted polarized wave.

In the first embodiment, the controller 230 allocates one of a vertically polarized wave and a horizontally polarized wave to the UE 100 as a communication resource for radio communication. The specific polarized wave is one polarized wave assigned to the UE 100.

The UE 100 according to the first embodiment performs radio communication with the eNB 200. As illustrated in FIG. 2, the receiver 110 receives, from the eNB 200, the reference signal transmitted with the specific polarized wave. The controller 130 calculates a difference between the polarized wave of the received reference signal and the specific polarized wave and generates the polarized wave adjustment information used for adjusting the polarized wave by the eNB 200. The transmitter 120 transmits the polarized wave adjustment information to the eNB 200.

In the first embodiment, the UE 100 includes an orthogonally polarized antenna provided with a pair of antennas. The controller 130 calculates the difference based on the reception level of the reference signal in each antenna of the orthogonally polarized antenna.

In the first embodiment, one of the vertically polarized wave and the horizontally polarized wave is allocated from the eNB 200 to the UE 100 as the communication resource for radio communication. The specific polarized wave is one polarized wave assigned to the UE 100.

(2) Assumed Scenario According to First Embodiment

FIG. 6 is a diagram illustrating an assumed scenario according to the first embodiment. In the first embodiment, communication is performed with a specific polarized wave between the base station (eNB 200) and the radio terminal (UE 100).

As illustrated in FIG. 6, an eNB 200-1 performs radio communication with a UE 100-1. An eNB 200-2 performs radio communication with a UE 100-2. Each of the eNB 200-1 and the eNB 200-2 manages a cell. The eNB 200-1 and the eNB 200-2 may be disposed indoors. Such a compact eNB disposed indoors may be referred to as a home eNB.

Each of the eNB 200-1 and the eNB 200-2 includes an orthogonally polarized antenna. The orthogonally polarized antenna includes a pair of antennas (a vertically polarized antenna V and a horizontally polarized antenna H). The eNB 200-1 and the eNB 200-2 perform radio communication with different polarized waves by using the same time and frequency resources. That is, the eNB 200-1 and the eNB 200-2 perform multiplex communication (polarization multiplexing) by using orthogonality of polarized waves.

In the example of FIG. 6, the eNB 200-1 transmits an information signal to the UE 100-1 with a vertically polarized wave by using a vertically polarized antenna V. The eNB 200-2 transmits an information signal to the UE 100-2 with a horizontally polarized wave by using a horizontally polarized antenna H. The information signal mainly means data, but may be a control signal.

The UE 100-1 receives, from the eNB 200-1, the information signal transmitted with the vertically polarized wave. The UE 100-2 receives, from the eNB 200-2, the information signal transmitted with the horizontally polarized wave.

Here, if the UE 100-1 has a single polarized antenna, the polarized antenna of the UE 100-1 and the vertically polarized antenna V of the eNB 200-1 need to have uniform polarization planes. Similarly, if the UE 100-2 has a single polarized antenna, the polarized antenna of the UE 100-2 and the horizontally polarized antenna H of the eNB 200-2 need to have uniform polarization planes.

However, the direction of the UE 100 is not constant and the polarized wave may rotate in a radio propagation path. Therefore, there may be a difference between the polarized wave at the time of transmission and the polarized wave at the time of reception. Therefore, in the first embodiment, the UE 100 is provided with an orthogonally polarized antenna including a pair of antennas (a vertically polarized antenna V and a horizontally polarized antenna H). Then, the rotation of the polarized wave caused by the direction of the UE 100 and the propagation path change is detected in the UE 100 and fed back, and thus it is possible to perform transmission and reception with a specific polarized wave.

FIG. 6 illustrates an example in which the eNB 200-1 transmits the vertically polarized wave and the eNB 200-2 transmits the horizontally polarized wave. However, one eNB 200 may perform both the transmission of the vertically polarized wave and the transmission of the horizontally polarized wave.

(3) Operation Sequence According to First Embodiment

FIG. 7 is a diagram illustrating an operation sequence according to the first embodiment. Prior to the present sequence, the eNB 200 may allocate one of the vertically polarized wave and the horizontally polarized wave to the UE 100 as the communication resource for radio communication and notify the UE 100 of the one polarized wave. The notification may be performed by PDCCH, MAC control element, or RRC signaling.

As illustrated in FIG. 7, in step S11, the eNB 200 transmits a reference signal to the UE 100 with a specific polarized wave. The specific polarized wave is a vertically polarized wave or a horizontally polarized wave. The reference signal is a known signal sequence. The reference signal may be configured to be distinguishable whether it is a vertically polarized wave or a horizontally polarized wave. For example, the signal sequence of the reference signal may be different according to whether it is the vertically polarized wave or the horizontally polarized wave. The arrangement of the time and frequency resources of the reference signal may be different according to whether it is the vertically polarized wave or the horizontally polarized wave.

The UE 100 receives, from the eNB 200, the reference signal transmitted with the specific polarized wave. In step S12, the UE 100 calculates the difference between the polarized wave of the received reference signal and the specific polarized wave (that is, the rotation angle of the polarized wave), and generates the polarized wave adjustment information used for adjusting the polarized wave by the eNB 200. A method of calculating the rotation angle of the polarized wave will be described later. The polarized wave adjustment information is an index value indicating a direct value of the rotation angle of the polarized wave or a rotation angle of the polarized wave. Alternatively, the UE 100 may determine a transmission polarized wave to be applied by the eNB 200 based on the rotation angle of the polarized wave, and may generate the polarized wave adjustment information indicating the determined polarized wave.

In step S13, the UE 100 transmits the polarized wave adjustment information to the eNB 200. The UE 100 may transmit the polarized wave adjustment information via PUCCH, MAC control element, or RRC signaling. The UE 100 may transmit the polarized wave adjustment information in response to reception of a request from the eNB 200.

The eNB 200 receives the polarized wave adjustment information from the UE 100. In step S14, the eNB 200 uses the polarized wave adjustment information to adjust the polarized wave based on a specific polarized wave. A method of adjusting the polarized wave direction will be described later.

In step S15, the eNB 200 transmits the information signal to the UE 100 with the adjusted polarized wave. The UE 100 receives the information signal from eNB 200.

The procedures from step S11 to step S15 may be repeatedly performed. In the second and subsequent procedures, the transmission of the reference signal and the transmission of the information signal may be performed at the same time.

(4) Method of Calculating Polarized Wave Rotation Angle According to First Embodiment A method of calculating a polarized wave rotation angle according to the first embodiment (that is, details of step S12) will be described. Here, it is assumed that the eNB 200 transmits the reference signal with the vertically polarized wave by using the vertically polarized antenna V.

FIG. 8 is a diagram illustrating a method of calculating a polarized wave rotation angle according to the first embodiment.

Figure 8A:
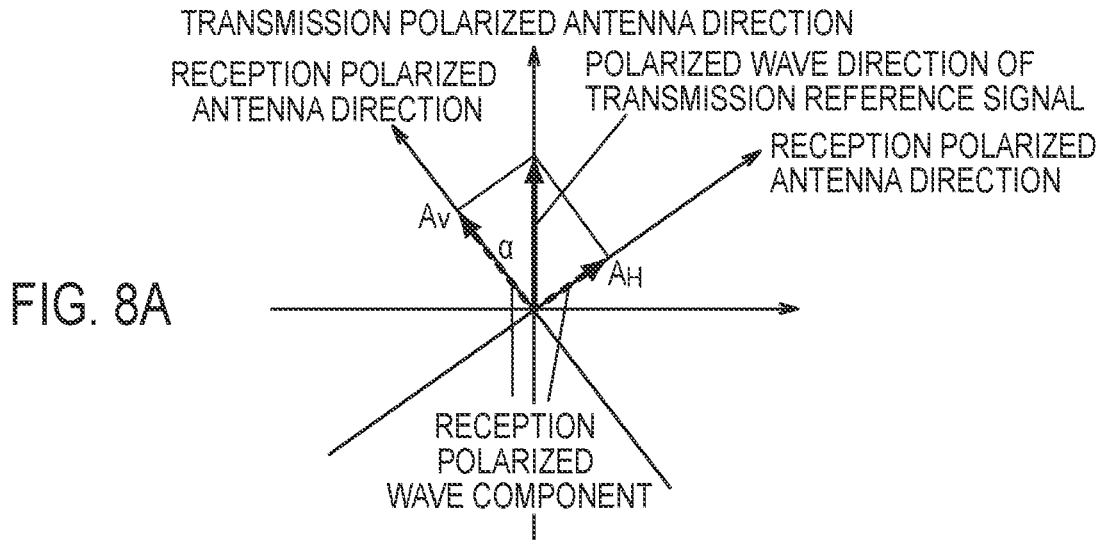
FIG. 8 is a diagram illustrating a polarized wave rotation angle calculation method according to the first embodiment.
Figure 8B:
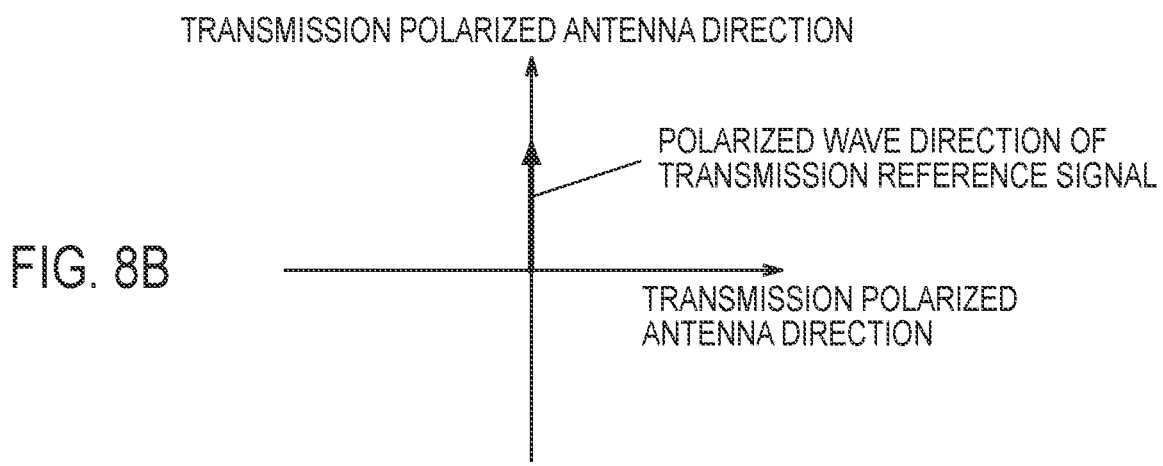
Figure 8C:
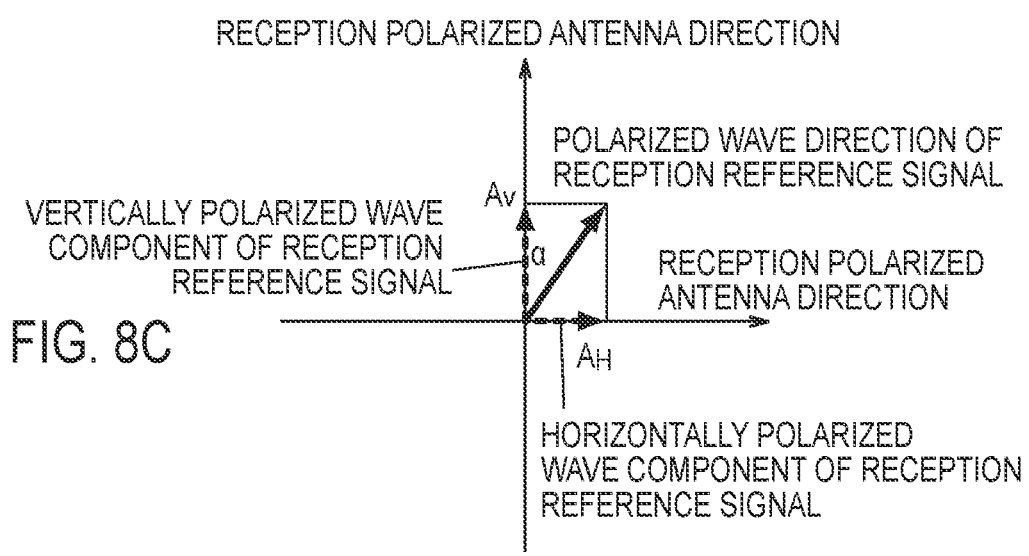

As illustrated in FIGS. 8(a) and 8(b), the eNB 200 transmits a reference signal with a vertically polarized wave. On the other hand, as illustrated in FIG. 8(a), the vertically polarized antenna direction of the UE 100 is inclined with respect to the vertical direction (that is, "shift" occurs). In addition, the horizontally polarized antenna direction of the UE 100 is inclined (shifted) with respect to the horizontal direction. This shift may be interpreted as either or both of the physical inclination of the polarized antenna of the UE 100 and the rotation of the polarized wave in the radio propagation path. As illustrated in FIG. 8(c), from the viewpoint of the UE 100, a polarized wave (reference signal) rotated clockwise by an angle α is observed.

In FIGS. 8(a) and 8(c), the angle (that is, the polarized wave rotation angle) of the inclination of the UE 100 with respect to the vertical direction of the vertically polarized antenna direction is indicated by "α". The reference signal reception level (vertically polarized wave component) of the vertically polarized antenna of the UE 100 is indicated by "$A_v$". The reference signal reception level (horizontal polarized wave component) of the horizontally polarized antenna of the UE 100 is indicated by "$A_H$". The UE 100 measures the reception levels "$A_v$" and "$A_H$" and calculates the polarized wave rotation angle "α" by the following formula.

$$\alpha = \arctan\frac{A_H}{A_V} \quad \text{[Math. 1]}$$

According to this formula, the polarized wave rotation in the radio propagation path can also be detected collectively.

(5) Polarized Wave Adjustment Method According to First Embodiment

A polarized wave adjustment method according to the first embodiment (that is, details of step S14) will be described. Here, it is assumed that a calculated by the formula (1) is notified from the UE 100 to the eNB 200 as the polarized wave adjustment information.

Figure 9:
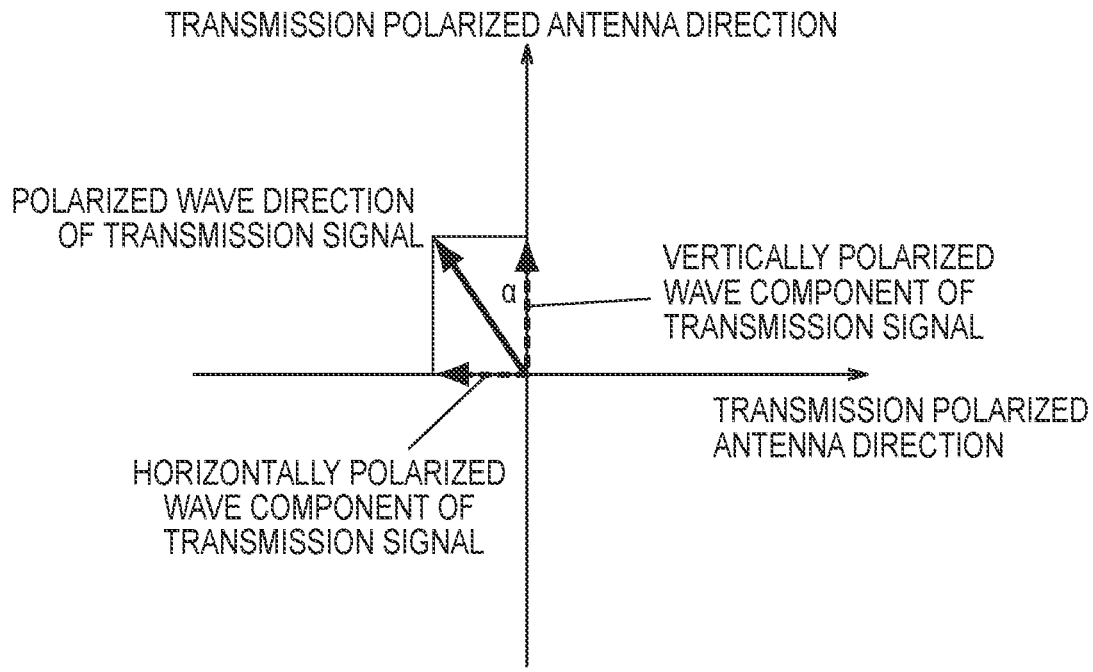
FIG. 9 is a diagram illustrating a polarized wave adjustment method according to the first embodiment.

FIG. 9 is a diagram illustrating a polarized wave adjustment method according to the first embodiment. As illustrated in FIG. 9, the eNB 200 adjusts the polarized wave of the information signal by the counterclockwise angle α. The eNB 200 adjusts the polarized wave of the information signal by controlling the transmission level (vertically polarized wave component) of the vertically polarized antenna V and the transmission level (horizontally polarized wave component) of the horizontally polarized antenna H.

For example, if the information signal S(t) is received as the vertically polarized wave on the UE 100 side, the eNB 200 adjusts the polarized wave of the information signal by the counterclockwise angle α through transmission with the vertically polarized wave component and the horizontally polarized wave component as described below.

The vertically polarized wave transmission component of the information signal S(t) is as follows:

$$S(t)\cos \alpha \quad \text{[Math. 2]}$$

In addition, the horizontally polarized wave transmission component of the information signal S (t) is as follows:

$$-S(t)\sin \alpha \quad \text{[Math. 3]}$$

As a result, the inclination of the polarized antenna of the UE 100 or/and the polarized wave rotation angle due to the propagation path are offset. Therefore, the UE 100 receives the information signal S(t) only by the vertically polarized antenna thereof. Hereinafter, details will be described.

In the vertically polarized wave transmission component of the information signal S(t), the received signal of the vertically polarized receiving antenna of the UE 100 is represented by:

$$S(t)\cos \alpha \cos \alpha = S(t)\cos^2 \alpha \quad \text{[Math. 4]}$$

In the vertically polarized wave transmission component of the information signal S(t), the received signal of the horizontally polarized receiving antenna of the UE 100 is represented by:

$$S(t)\cos \alpha \sin \alpha \quad \text{[Math. 5]}$$

In the horizontally polarized wave transmission component of the information signal S(t), the received signal of the vertically polarized receiving antenna of the UE 100 is represented by:

$$S(t)\sin \alpha \sin \alpha = S(t)\sin^2 \alpha \quad \text{[Math. 6]}$$

In the horizontally polarized wave transmission component of the information signal S(t), the received signal of the horizontally polarized receiving antenna of the UE 100 is represented by:

$$-S(t)\sin \alpha \cos \alpha \quad \text{[Math. 7]}$$

Totally, the reception signal of the vertically polarized receiving antenna of the UE 100 is represented by:

$$S(t)\cos^2 \alpha + S(t)\sin^2 \alpha = S(t) \quad \text{[Math. 8]}$$

In addition, the reception signal of the horizontally polarized receiving antenna of the UE 100 is represented by:

$$S(t)\cos \alpha \sin \alpha - S(t)\sin \alpha \cos \alpha = 0 \quad \text{[Math. 9]}$$

That is, if the eNB 200 transmits the polarized wave after adjustment by the counterclockwise α, the UE 100 can receive the polarized wave with one polarized antenna (the output of the another polarized receiving antenna becomes 0).

(Modification 1 of First Embodiment)

In modification 1 of the first embodiment, a difference from the first embodiment will be mainly described.

In modification 1 of the first embodiment, the controller 230 of the eNB 200 allocates the rotation speed of the polarized wave to the UE 100 as the communication resource for radio communication. The transmitter 210 of the eNB 200 transmits the information signal S(t) to the UE 100 while rotating the polarized wave at the rotation speed allocated to the UE 100.

In modification 1 of the first embodiment, the rotation speed of the polarized wave is allocated from the eNB 200 to the UE 100 as the communication resource for radio communication. The receiver 110 of the UE 100 receives the information signal S(t) transmitted by the eNB 200 while rotating the polarized wave at the rotation speed allocated to the UE 100.

Therefore, according to modification 1 of the first embodiment, it is possible to increase the number of orthogonal channels by using the rotation speed of the polarized wave and further increase the communication capacity.

Figure 10:
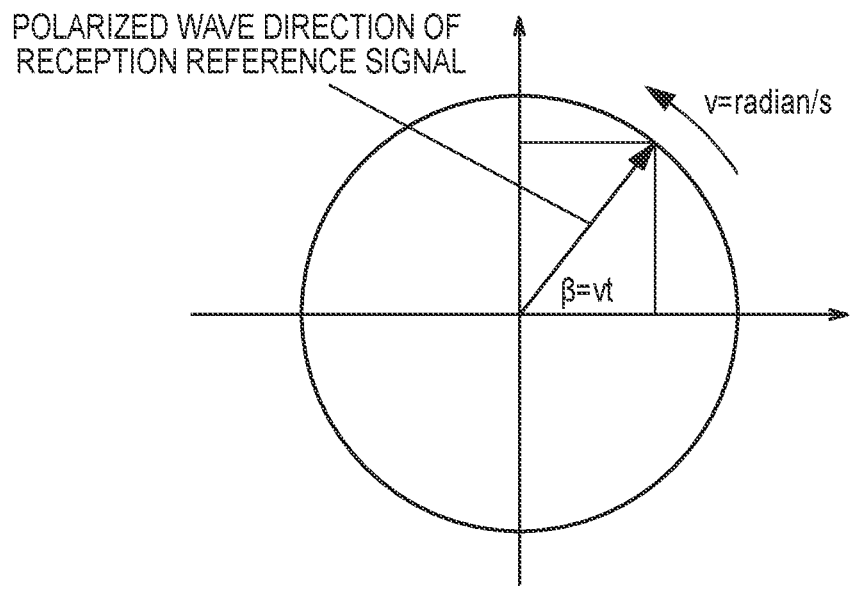
FIG. 10 is a diagram illustrating a transmission operation of an eNB according to modification 1 of the first embodiment.

FIG. 10 is a diagram illustrating the transmission operation of the eNB 200 according to modification 1 of the first embodiment. As illustrated in FIG. 10, the eNB 200 transmits the information signal S(t) while rotating the polarized wave. The rotation speed is v (radian/s).

In the following, it is assumed that the UE 100 has already transmitted a (feedback) to the eNB 200 by using the method described in the first embodiment. The eNB 200 previously adjusts the polarized wave by using α. In addition, it is assumed that the eNB 200 allocates the rotation speed v of the polarized wave to the UE 100 and notifies the UE 100 of the rotation speed v. The notification may be performed by PDCCH, MAC control element, or RRC signaling.

In the transmission of the eNB 200, the transmission component of the vertically polarized antenna of the information signal S (t) is represented by:

$$S_V = S(t)\sin(\beta + \alpha) = S(t)\sin(vt + \alpha) \quad [\text{Math. 10}]$$

In the transmission of the eNB 200, the transmission component of the horizontally polarized antenna of the information signal S (t) is represented by:

$$S_H = S(t)\cos(\beta + \alpha) = S(t)\cos(vt + \alpha) \quad [\text{Math. 11}]$$

It should be noted that the operation according to the first embodiment can be regarded as a special example of the rotation speed v=0.

In the UE 100, the reception signal of the vertically polarized receiving antenna is represented by:

$$R_V = h(t)S(t)\sin(vt+\alpha)\cos(\alpha) - h(t)S(t)\cos(vt+\alpha)\sin(\alpha) \quad [\text{Math. 12}]$$

However, h(t) is a propagation coefficient and function.

In the UE 100, the reception signal of the horizontally polarized receiving antenna is represented by:

$$R_H = h(t)S(t)\sin(vt+\alpha)\sin(\alpha) + h(t)S(t)\cos(vt+\alpha)\cos(\alpha) \quad [\text{Math. 13}]$$

Then, the synthesis is performed as follows:

$$R = R_H \cos(vt) + R_V \sin(vt)$$

$$R_V \sin(vt) = h(t)S(t)\sin(vt+\alpha)\cos(\alpha)\sin(vt) - h(t)S(t)\cos(vt+\alpha)\sin(\alpha)\sin(vt)$$

$$R = h(t)S(t)(\cos^2(vt+\alpha) + \sin^2(vt+\alpha)) = h(t)S(t) \quad [\text{Math. 14}]$$

Therefore, the UE 100 can correctly receive the signal h(t)S(t).

In this manner, the UE 100 performs reception in synchronization with the rotation speed of the polarized wave of the eNB 200, so that the information signal can be correctly received. On the other hand, another UE (hereinafter referred to as an "asynchronous UE") that does not perform reception in synchronization with the rotation speed of the polarized wave of the eNB 200 cannot receive the information signal.

The reception in the asynchronous UE is represented as follows. For convenience of description, it is assumed that the inclination of the UE receiving antenna or the polarized wave rotation due to the propagation path is α (it is assumed that the polarized wave rotation adjustment amount α for the synchronous UE is included in α'). In addition, since the asynchronous UE does not know the polarized wave rotation speed allocated to the UE 100 (synchronous UE), the received signals are combined at a random polarized wave rotation speed or a polarized wave rotation speed allocated to the asynchronous UE. It is assumed that the random polarized wave rotation speed or the polarized wave rotation speed allocated to the asynchronous UE is v'.

$$R = R_H\cos(v't) + R_V\sin(v't) \quad [\text{Math. 15}]$$

$$R_H\cos(v't) = h(t)S(t)\sin(vt)\sin(\alpha')\cos(v't) +$$

$$h(t)S(t)\cos(vt)\cos(\alpha')\cos(v't)$$

$$R_V\sin(v't) = h(t)S(t)\sin(vt)\cos(\alpha')\sin(v't) -$$

$$h(t)S(t)\cos(vt)\sin(\alpha')\sin(v't)$$

$$R = R_H\cos(v't) + R_V\sin(v't) = h(t)S(t)\cos(v't - vt - \alpha')$$

In this manner, the AC component is included in the received signal (AC component other than h(t)S(t) is included in even without combination).

$$\cos(v't - vt + \alpha') \quad [\text{Math. 16}]$$

If the difference between v' and v is sufficient, it can be considered that the asynchronous UE cannot perform reception. More specifically, if the difference between v' and v is sufficiently taken in terms of system design, the reception level (interference level) of the asynchronous UE can be made zero by integration within one symbol range or the like. For example, one symbol of LTE is 0.5/7 (ms), equivalent to 7/0.5=14 (kHz) when "converted" by frequency. In terms of system design, if the difference between v' and v is several times of 14 kHz, it is considered that it is possible to set the reception (interference) level of the asynchronous UE to 0 by integration within 1 symbol range.

(Modification 2 of First Embodiment)

In modification 2 of the first embodiment, a difference from the first embodiment will be mainly described.

The UE 100 may feed back not only polarized wave adjustment information to the eNB 200 but also auxiliary information used for transmission by the eNB 200 to the eNB 200. The auxiliary information includes a reception signal-to-noise ratio (SNR) of the reference signal, cross polarization discrimination (XPD), a state of the UE 100 (stationary/moving, left/held by a person, etc.), and at least one of relative H/V gain values measured by a geomagnetic sensor.

(Modification 3 of First Embodiment)

In modification 3 of the first embodiment, a difference from the first embodiment will be mainly described.

When performing transmission to the UE 100, the eNB 200 may further transmit information about the polarized wave control of the transmission. The information may be information indicating the polarized wave applied for transmission by the eNB 200. Another eNB that has received the information performs its own transmission polarized wave control so as to be orthogonal to the transmission polarized wave of the eNB 200 based on the received information. The eNB 200 may transmit the information to another eNB through a backhaul connection such as an X2 interface.

Second Embodiment

In the second embodiment, a difference from the first embodiment will be described below.

The second embodiment is an embodiment in which the eNB can autonomously establish the radio backhaul connection between the eNBs. For example, in a communication environment in which cell size reduction and high density arrangement are performed, radio backhaul connection is effective from the viewpoint of cost and the like. The radio backhaul connection between the eNBs is used for synchronization or cooperative control between the eNBs. It is assumed that the communication of the radio backhaul is performed in a high frequency band such as a millimeter wave band.

As illustrated in FIG. 3, in the eNB 200 according to the second embodiment, the receiver 220 receives, from another eNB, a reference signal transmitted with a specific polarized wave. The controller 230 calculates the difference (that is, the polarized wave rotation angle) between the polarized wave of the received reference signal and the specific polarized wave. The controller 230 determines whether line-of-sight communication is possible between the eNB and another eNB, based on the difference. The method of calculating the polarized wave rotation angle is the same as in the first embodiment. That is, the eNB 200 calculates the difference (polarized wave rotation angle) based on the reception level of the reference signal in each antenna (vertically polarized antenna and vertically polarized antenna) of the orthogonally polarized antenna. The eNB 200 may compare the polarized wave rotation angle with a threshold value and determine that the line-of-sight communication is possible when the polarized wave rotation angle is less than the threshold value. On the other hand, if the polarized wave rotation angle is greater than or equal to the threshold value, the eNB 200 may determine that the line-of-sight communication is not possible.

The transmitter 210 of the eNB 200 according to the second embodiment transmits, to another eNB 200, the information for establishing the radio backhaul connection between the eNB 200 and the other eNB 200 according to the determination that the line-of-sight communication is possible.

FIG. 11 is a diagram illustrating an operation sequence according to the second embodiment.

As illustrated in FIG. 11, in step S21, the eNB 200-2 transmits a reference signal to the eNB 200-1 with a specific polarized wave. The specific polarized wave may be a vertically polarized wave or a horizontally polarized wave. Such a polarization-controlled reference signal may be a signal (that is, a downlink signal) that the eNB 200-2 transmits to the UE. The polarization-controlled reference signal may be a signal for radio backhaul communication. The reference signal may include information capable of identifying the eNB 200-2.

The eNB 200-1 receives the reference signal from the eNB 200-2. In step S22, the eNB 200-1 analyzes the received reference signal (see the first embodiment).

In step S23, the eNB 200-1 determines whether to establish the radio backhaul connection with the eNB 200-2. In the following description, the description will be given on the assumption that it is determined to establish the radio backhaul connection.

In step S24, the eNB 200-1 transmits an establishment request of the radio backhaul connection to the eNB 200-2. The eNB 200-1 may transmit the establishment request to the eNB 200-2 as a radio signal. The eNB 200-1 may transmit the establishment request to the eNB 200-2 via a core network.

In step S25, the eNB 200-2 transmits, to the eNB 200-1, an acknowledgment (establishment response) to the request in response to the reception of the establishment request from the eNB 200-1. The eNB 200-2 may transmit the acknowledgment to the eNB 200-1 as the radio signal. The eNB 200-2 may transmit the acknowledgment to the eNB 200-1 via the core network.

In step S26, the radio backhaul connection is established between the eNB 200-1 and the eNB 200-2.

Each of the establishment request (step S24) and the acknowledgment (step S25) may be a message including various types of information related to the eNB 200 of the transmission source. The various types of information may include an eNB ID of a sender eNB 200 and information (cell ID or the like) of the cell managed by the sender eNB 200. In a case in which the establishment request and the acknowledgment are transmitted and received by radio signals, the establishment request may be a random access preamble. The acknowledgment may be a random access response. The establishment request and the acknowledgments may be a message transmitted and received during an RRC connection establishment procedure. In this case, the establishment request may include a cause IE indicating the establishment of the radio backhaul connection. The acknowledgment may include information about the configuration of the radio backhaul connection (for example, configuration of the subframe used for the radio backhaul).

Other Embodiments

In the above-described embodiment, an example using the vertically polarized wave and the horizontally polarized wave has been described. However, other polarized wave directions (for example, 45° polarized wave and 135° polarized wave) may be used instead of the vertically polarized wave and the horizontally polarized wave.

In the above-described embodiment, for convenience of description, the detection and correction of the polarized wave rotation angle "α" have been described on the assumption that the plane on which the base station polarized antenna is located is parallel to the plane on which the polarized antenna of the radio terminal is located. However, they are not necessarily parallel and may be in any positional relationship. In this case, the idea of detection and correction is the same, and mathematical calculation is only slightly complicated. Specifically, in the above-described embodiment, the calculation of the trigonometric function on the X-Y plane has been described, but it is sufficient to calculate the trigonometric function on the X-Y-Z space.

In the above-described embodiment, the communication environment in which the cells are miniaturized and densely arranged and the band is broadened by using the high frequency band is mainly assumed. However, the present disclosure is not limited thereto. The operation according to the above-described embodiment may be applied to a scenario in which the cells are not miniaturized and densely arranged and/or the band is not broadened by using the high frequency band. For example, the operation according to the above-described embodiment may be applied to a scenario in which macrocells are arranged.

In the above-described embodiment, an example in which the orthogonally polarized antenna is provided with a pair of antennas has been described. However, the orthogonally polarized antenna may have a plurality of pairs of antennas.

In the above-described embodiment, the LTE system has been exemplified as the radio communication system. However, the present disclosure is not limited to the LTE system. The present disclosure may be applied to systems other than the LTE system. For example, if the present disclosure is applied to a radio LAN system, the base station may be referred to as an access point (AP).

The present disclosure is not limited to the case in which the above-described embodiments are separately and independently performed, but the plurality of embodiments may be performed in combination. For example, the polarization multiplex communication according to the first embodiment may be applied to the radio backhaul connection according to the second embodiment.

CROSS-REFERENCE

This application claims the priority of Japanese Patent Application No. 2016-088306 (filed on Apr. 26, 2016), the entire contents of which are incorporated herein by reference.

INDUSTRIAL APPLICABILITY

The present disclosure is useful in the communication field.

The invention claimed is:

1. A base station configured to perform radio communication with a radio terminal, the base station comprising:
   a transmitter configured to transmit a reference signal to the radio terminal with a specific polarized wave;
   a receiver configured to receive, from the radio terminal, polarized wave adjustment information generated by using the reference signal; and
   a controller configured to adjust a polarized wave based on the specific polarized wave by using the polarized wave adjustment information,
   wherein the transmitter is configured to transmit an information signal to the radio terminal with the adjusted polarized wave,
   the controller is configured to allocate a rotation speed of the polarized wave to the radio terminal as a communication resource for the radio communication, and
   the transmitter is configured to transmit the information signal to the radio terminal while rotating the polarized wave at a rotation speed allocated to the radio terminal.

2. The base station according to claim 1,
   wherein the controller is configured to allocate one of a vertically polarized wave and a horizontally polarized wave to the radio terminal as a communication resource for the radio communication, and
   the specific polarized wave is the one polarized wave allocated to the radio terminal.

3. A radio terminal configured to perform radio communication with a base station, the radio terminal comprising:
   a receiver configured to receive, from the base station, a reference signal transmitted with a specific polarized wave;
   a controller configured to generate polarized wave adjustment information used for adjusting a polarized wave by the base station by calculating a difference between a polarized wave of the received reference signal and the specific polarized wave; and
   a transmitter configured to transmit the polarized wave adjustment information to the base station,
   wherein the radio terminal is configured to allocate a rotation speed of the polarized wave from the base station as a communication resource for the radio communication, and
   the receiver is configured to receive, from the base station, an information signal transmitted while rotating the polarized wave at a rotation speed allocated to the radio terminal.

4. The radio terminal according to claim 3, comprising
   an orthogonally polarized antenna provided with at least a pair of antennas,
   wherein the controller is configured to calculate the difference based on a reception level of the reference signal in each antenna of the orthogonally polarized antenna.

5. The radio terminal according to claim 3,
   wherein the radio terminal is configured to allocate one of a vertically polarized wave and a horizontally polarized wave from the base station as a communication resource for the radio communication, and
   the specific polarized wave is the one polarized wave allocated to the radio terminal.

6. A base station configured to perform radio communication with a radio terminal, the base station comprising:
   a receiver configured to receive, from another base station, a reference signal transmitted with a specific polarized wave; and
   a controller configured to calculate a difference between a polarized wave of the received reference signal and the specific polarized wave, and determine whether line-of-sight communication is possible between the base station and the another base station based on the difference.

7. The base station according to claim 6, comprising
   a transmitter configured to transmit, to the another base station, information for establishing a radio backhaul connection between the base station and the other base station in response to the determination that the line-of-sight communication is possible.

8. The base station according to claim 6, comprising
   an orthogonally polarized antenna provided with at least a pair of antennas,
   wherein the controller is configured to calculate the difference based on a reception level of the reference signal in each antenna of the orthogonally polarized antenna.

* * * * *